(12) United States Patent
Zhu et al.

(10) Patent No.: US 11,451,048 B2
(45) Date of Patent: Sep. 20, 2022

(54) RAPID SHUTDOWN DEVICE AND PHOTOVOLTAIC SYSTEM

(71) Applicant: Delta Electronics, Inc., Taoyuan (TW)

(72) Inventors: Xuancai Zhu, Taoyuan (TW); Bingwen Weng, Taoyuan (TW); Yanlong Li, Taoyuan (TW); Wei Zhao, Taoyuan (TW); Bin Wang, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 108 days.

(21) Appl. No.: 16/406,545

(22) Filed: May 8, 2019

(65) Prior Publication Data
US 2020/0006936 A1   Jan. 2, 2020

(30) Foreign Application Priority Data

Jun. 27, 2018 (CN) .......................... 201810675114.4

(51) Int. Cl.
*H02H 7/20* (2006.01)
*H02S 40/32* (2014.01)
*H02J 3/38* (2006.01)
*H02J 13/00* (2006.01)
*H02S 50/10* (2014.01)

(52) U.S. Cl.
CPC .............. *H02H 7/20* (2013.01); *H02J 3/383* (2013.01); *H02J 13/00007* (2020.01); *H02S 40/32* (2014.12); *H02S 50/10* (2014.12)

(58) Field of Classification Search
CPC ...... H02S 50/10; H02H 7/20; H02J 13/00007; H02J 13/383
See application file for complete search history.

(56) References Cited

U.S. PATENT DOCUMENTS

| 10,075,127 B1* | 9/2018 | Zou ..................... H01L 31/0443 |
| 2013/0320767 A1* | 12/2013 | Huang ............. H01L 31/02021 307/77 |
| 2016/0211797 A1* | 7/2016 | Zhu ........................ H02S 40/34 |

FOREIGN PATENT DOCUMENTS

| CN | 203984351 U | 12/2014 |
| CN | 106602504 A | 4/2017 |

(Continued)

*Primary Examiner* — Ryan Johnson
*Assistant Examiner* — Colleen J O Toole
(74) *Attorney, Agent, or Firm* — Kirton McConkie; Evan R. Witt (57) ABSTRACT

A rapid shutdown device and a photovoltaic system are provided. The photovoltaic system includes an inverter and multiple serially-connected photovoltaic elements. The rapid shutdown device includes a switching circuit, a control circuit, a communication circuit and an auxiliary power circuit. The switching circuit includes a first switch and a second switch. A first terminal of the first switch is electrically connected with the positive terminal of a first photovoltaic element. A second terminal of the first switch is electrically connected with the negative terminal of a second photovoltaic element. A first terminal of the second switch is electrically connected with the negative terminal of the first photovoltaic element. The communication circuit receives a command signal from the inverter and transmits it to the control circuit. The control circuit controls the first switch and the second switch to turn on or turn off according to the command signal.

20 Claims, 4 Drawing Sheets

(56) References Cited

FOREIGN PATENT DOCUMENTS

| CN | 106602998 A | 4/2017 |
|----|-------------|--------|
| CN | 207543063 U | 6/2018 |

\* cited by examiner

RAPID SHUTDOWN DEVICE AND PHOTOVOLTAIC SYSTEM

CROSS REFERENCE

This application claims priority to China Patent Application No. 201810675114.4, filed on Jun. 27, 2018, the entire contents of which are incorporated herein by reference for all purposes.

TECHNICAL FIELD

The present disclosure relates to a photovoltaic power generation field, and more particularly to a rapid shutdown device and a photovoltaic system.

BACKGROUND

Generally, a photovoltaic system comprises multiple serially-connected photovoltaic elements and an inverter. The photovoltaic element is used for converting the received solar energy into DC power. The inverter is used for receiving the DC power from the photovoltaic elements and converting the DC power into AC power. The AC power is sent to a power grid or directly provided to power-receiving devices.

The multiple serially-connected photovoltaic elements results in a very high voltage. In the event of a natural disaster such as a fire or an earthquake, the life safety of the relevant personnel may be threatened due to a false touch. For improving the safety of the photovoltaic system, the photovoltaic system has to meet the requirements of Rapid Shutdown (RS) according to Section 690.12 of NEC 2017 (American National Electrical Code 2017). For example, the photovoltaic system is equipped with a rapid shutdown device between the serially-connected photovoltaic elements and the inverter. When the photovoltaic system has a malfunction, the serially-connected photovoltaic elements and the inverter are isolated by the rapid shutdown device. Consequently, the requirement of the NEC 2017 can be achieved. However, the internal voltage of the photovoltaic element is still high, which threatens the safety of the firefighters or other relevant personnel.

Therefore, there is a need of providing an improved rapid shutdown device and an improved photovoltaic system in order to overcome the drawbacks of the conventional technologies.

SUMMARY

In accordance with an aspect of the present disclosure, there is provided a rapid shutdown device for a photovoltaic system. The photovoltaic system includes an inverter and multiple serially-connected photovoltaic elements. Each of the photovoltaic elements includes a positive terminal and a negative terminal. The rapid shutdown device includes a switching circuit, a control circuit, a communication circuit and an auxiliary power circuit. The switching circuit includes a first switch and a second switch. A first terminal of the first switch is electrically connected with the positive terminal of a first photovoltaic element of the multiple photovoltaic elements. A second terminal of the first switch is electrically connected with the negative terminal of a second photovoltaic element of the multiple photovoltaic elements. A first terminal of the second switch is electrically connected with the negative terminal of the first photovoltaic element. The control circuit is electrically connected with the first switch and the second switch, and controls the first switch and the second switch to turn on or turn off according to a command signal. The communication circuit is electrically connected with the control circuit and in communication with the inverter. The communication circuit receives the command signal from the inverter, and transmits the command signal to the control circuit. The auxiliary power circuit provides required electric energy to power the rapid shutdown device.

In accordance with another aspect of the present disclosure, there is provided a photovoltaic system. The photovoltaic system includes multiple photovoltaic elements, an inverter and a rapid shutdown device according to the above. The multiple photovoltaic elements are serially connected with each other. The multiple photovoltaic elements convert solar energy into DC voltage. The inverter is used for converting the DC voltage into AC voltage. The rapid shutdown device is electrically connected with the first photovoltaic element of the multiple photovoltaic elements, and the first photovoltaic element is controlled by the rapid shutdown device to electrically connect with the photovoltaic system or disconnect from the photovoltaic system.

DETAILED DESCRIPTION

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
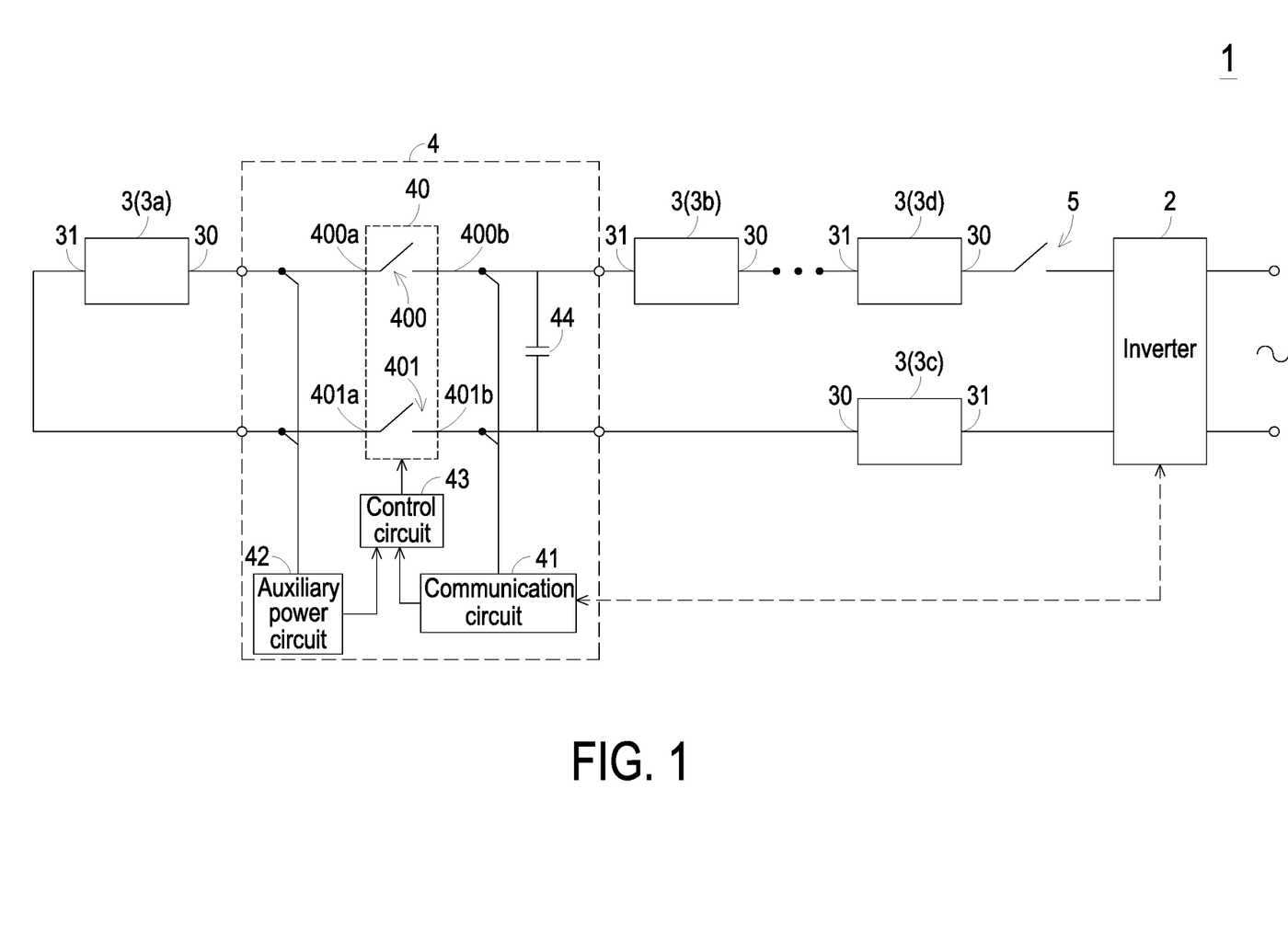
FIG. 1 is a schematic circuit diagram illustrating the architecture of a photovoltaic system according to a first embodiment of the present disclosure.

FIG. 1 is a schematic circuit diagram illustrating the architecture of a photovoltaic system according to a first embodiment of the present disclosure. As shown in FIG. 1, the photovoltaic system 1 comprises an inverter 2, multiple serially-connected photovoltaic elements 3 and a rapid shutdown device 4. Each photovoltaic element 3 comprises at least one photovoltaic panel, a positive terminal 30 and a negative terminal 31. The photovoltaic element 3 is used for converting the solar energy into a DC voltage. Preferably, the photovoltaic system 1 comprises at least two photovoltaic elements 3. In the embodiment of FIG. 1, the photovoltaic system 1 comprises more than three photovoltaic elements 3.

The inverter 2 comprises a first input terminal, a second input terminal and an output terminal. The first input terminal and the second input terminal of the inverter 2 are electrically connected with the corresponding photovoltaic elements 3 of the multiple photovoltaic elements 3. Consequently, the inverter 2 and the multiple photovoltaic elements 3 are serially connected to define a loop. The output terminal of the inverter 2 is electrically connected with a power grid or an AC device. The inverter 2 receives a total DC voltage of the DC voltages from the multiple serially-connected photovoltaic elements 3 through the first input terminal and the second input terminal thereof. After the total DC voltage is converted into an AC voltage by the inverter 2, the AC voltage is outputted to the power grid or the AC device. The inverter 2 may issue a command signal. According to the result of judging whether the inverter 2 is normally operated or according to the result of judging whether the inverter 2 is actively controlled by the user, the command signal is changeable. For example, the command signal issued from the inverter 2 includes a close-state command signal or an open-state command signal. When the inverter 2 is normally operated, the inverter 2 issues the close-state command signal. When the inverter 2 is not normally operated, the inverter 2 issues the open-state command signal.

The rapid shutdown device 4 comprises a switching circuit 40, a communication circuit 41, an auxiliary power circuit 42 and a control circuit 43. In this embodiment, the multiple serially-connected photovoltaic elements 3 at least includes a first photovoltaic element 3a, a second photovoltaic element 3b and a third photovoltaic elements 3c. The switching circuit 40 comprises a first switch 400 and a second switch 401. A first terminal 400a of the first switch 400 is electrically connected with the positive terminal 30 of the first photovoltaic element 3a. A second terminal 400b of the first switch 400 is electrically connected with the negative terminal 31 of the second photovoltaic element 3b. In this embodiment, as shown in FIG. 1, the second photovoltaic element 3b is one of the multiple serially-connected photovoltaic elements 3, which is close to the positive terminal 30 of the first photovoltaic element 3a. A first terminal 401a of the second switch 401 is electrically connected with the negative terminal 31 of the first photovoltaic element 3a. A second terminal 401b of the second switch 401 is electrically connected with a positive terminal 30 of the third photovoltaic element 3c. In this embodiment, as shown in FIG. 1, the third photovoltaic element 3c is one of the multiple serially-connected photovoltaic elements 3, which is close to the negative terminal 31 of the first photovoltaic element 3a. The first switch 400 and the second switch 401 are selectively turned on or turned off.

The communication circuit 41 is electrically connected with the control circuit 43. The communication circuit 41 is in communication with the inverter 2 to receive the command signal from the inverter 2 and transmit the command signal to the control circuit 43. The control circuit 43 is electrically connected with the first switch 400 and the second switch 401 of the switching circuit 40. The command signal from the inverter 2 is transmitted to the control circuit 43 through the communication circuit 41. According to the command signal, the first switch 400 and the second switch 401 are turned on or turned off under the control of the control circuit 43. If the command signal from the inverter 2 is the close-state command signal, the first switch 400 and the second switch 401 are turned on and closed under control of the control circuit 43. Since the first switch 400 and the second switch 401 are turned on, the first photovoltaic element 3a is serially connected with the other photovoltaic elements 3. Meanwhile, the first photovoltaic element 3a is electrically connected with the photovoltaic system 1, and thus the photovoltaic system 1 is normally operated. On the contrary, if the command signal from the inverter 2 is the open-state command signal, the first switch 400 and the second switch 401 are turned off and opened under control of the control circuit 43. Since the first switch 400 and the second switch 401 are turned off, the first photovoltaic element 3a is not serially connected with the other photovoltaic elements 3. Meanwhile, the first photovoltaic element 3a is disconnected from the photovoltaic system 1.

In some embodiments, the control circuit 43 has a function of detecting whether the switching circuit 40 is normally operated. If the detecting result indicates that the switching circuit 40 has a fault (e.g., the first switch 400 or the second switch 401 has a fault), the control circuit 43 issues a fault message to the inverter 2 through the communication circuit 41. The auxiliary power circuit 42 provides required electric energy to the rapid shutdown device 4 in order to power the rapid shutdown device 4. For example, the auxiliary power circuit 42 provides the required electric energy to the control circuit 43 of the rapid shutdown device 4.

As mentioned above, the rapid shutdown device 4 is arranged between multiple serially-connected photovoltaic elements 3. When the rapid shutdown device 4 receives the close-state command signal from the inverter 2, the first switch 400 and the second switch 401 of the rapid shutdown device 4 are turned on. Consequently, the multiple photovoltaic elements 3 are serially connected with each other to provide respective DC voltages to the inverter 2. If the inverter 2 is abnormal and issues the open-state command signal, the first switch 400 and the second switch 401 of the rapid shutdown device 4 are turned off. Consequently, the first photovoltaic element 3a is disconnected from the photovoltaic system 1. Since the multiple serially-connected photovoltaic elements 3 are separated, the multiple serially-connected photovoltaic elements 3 are divided into multiple photovoltaic modules with safer voltages. Under this circumstance, the possibility of getting electric shock is reduced. In this embodiment, the rapid shutdown device 4 comprises two switches, i.e., the first switch 400 and the second switch 401. If one of the two switches has a fault, the other switch is normally operated. In response to the open-state command signal, the multiple serially-connected photovoltaic elements 3 are also divided into multiple photovoltaic modules with safer voltages.

In some embodiments, the communication circuit 41 is a power line communication (PLC) circuit. The communication circuit 41 is electrically connected with the second terminal 400b of the first switch 400 and the second terminal 401b of the second switch 401. The command signal from the inverter 2 is a PLC command signal. In addition, the PLC communication between the inverter 2 and each photovoltaic element 3 is established. In this embodiment, the rapid shutdown device 4 further comprises a capacitor 44. The capacitor 44 is electrically connected between the second terminal 400b of the first switch 400 and the second terminal 401b of the second switch 401. When the first switch 400 and the second switch 401 are turned off, the PLC communication between the inverter 2 and the photovoltaic elements 3 excluding the first photovoltaic element 3a is also established through the capacitor 44.

Please refer to FIG. 1 again. The auxiliary power circuit 42 is electrically connected with the positive terminal 30 and the negative terminal 31 of the first photovoltaic element 3a. Consequently, the auxiliary power circuit 42 receives the electric energy from the first photovoltaic element 3a and converts the electric energy into the regulated voltage. In an embodiment, the photovoltaic system 1 further comprises a third switch 5. The multiple serially-connected photovoltaic elements 3 further includes a fourth photovoltaic element 3d. The third switch 5 is arranged between the first input terminal of the inverter 2 and the positive terminal 30 of the fourth photovoltaic element 3*d*. Preferably, as shown in FIG. 1, the fourth photovoltaic element 3*d* is one of the multiple serially-connected photovoltaic elements 3, which is most close to the first input terminal of the inverter 2. When the third switch 5 is controlled by a controller (not shown) or manually controlled by the user, the third switch 5 is selectively turned on or turned off. Consequently, the multiple photovoltaic elements 3 are electrically connected with or disconnected from the inverter 2 through the third switch 5. In other words, the multiple photovoltaic elements 3 can be added to the photovoltaic system 1 or disconnected from the photovoltaic system 1.

In some embodiments, preferably but not exclusively, the first switch 400 and the second switch 401 are mechanical switches or electronic switches. Under control of the control circuit 43, the first switch 400 and the second switch 401 are synchronously turned on or turned off, but it is not limited thereto.

Figure 2:
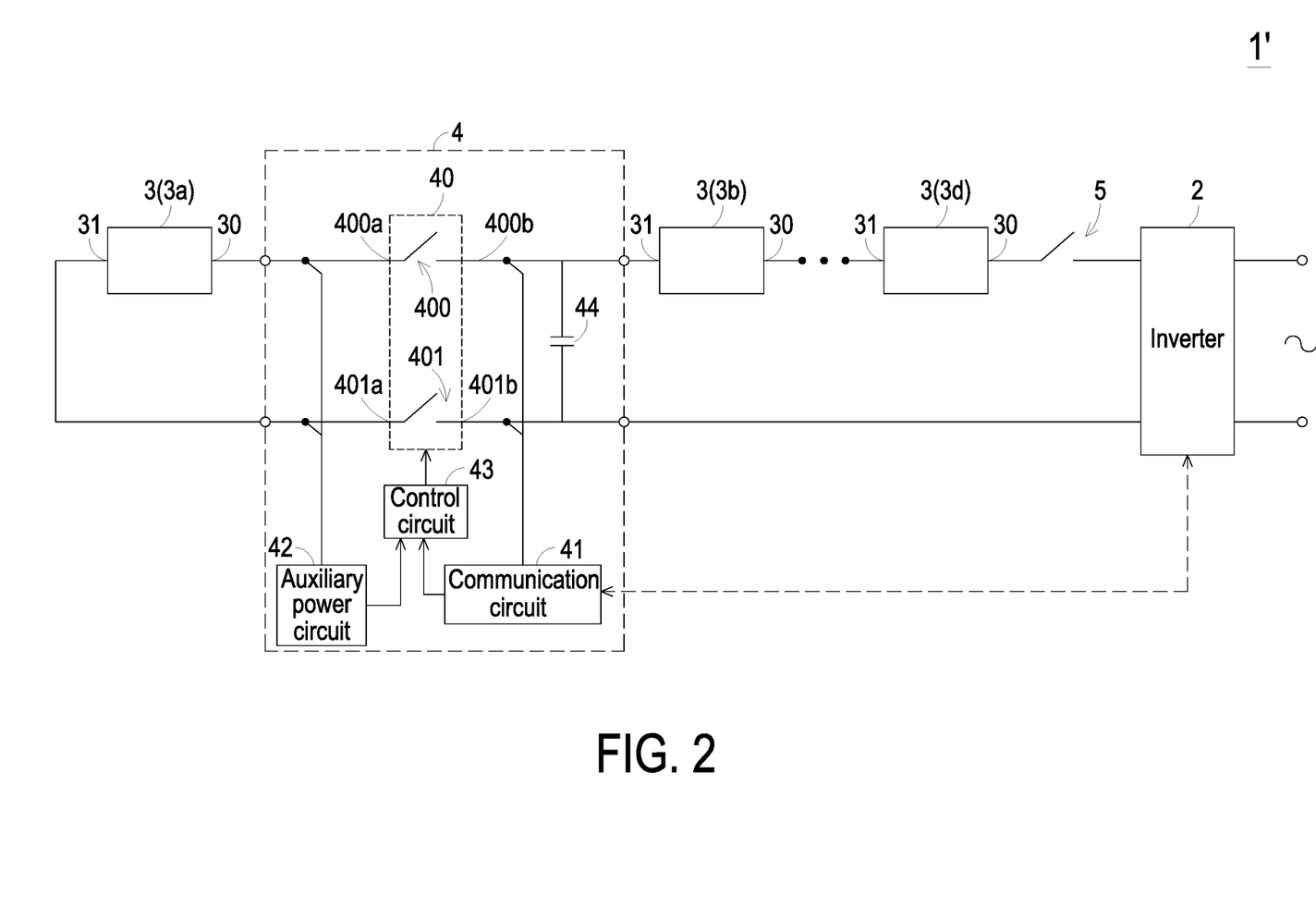
FIG. 2 is a schematic circuit diagram illustrating the architecture of a photovoltaic system according to a second embodiment of the present disclosure.

FIG. 2 is a schematic circuit diagram illustrating the architecture of a photovoltaic system according to a second embodiment of the present disclosure. In the photovoltaic system 1' of this embodiment, the second terminal 401*b* of the second switch 401 is electrically connected with the second input terminal of the inverter 2. The photovoltaic system 1' of this embodiment does not include the third photovoltaic elements 3*c*. The other components of this embodiment are similar to those of the first embodiment, and are not redundantly described herein.

It is noted that numerous modifications and alterations may be made while retaining the teachings of the disclosure. For example, in some other embodiments, the photovoltaic system comprises multiple rapid shutdown devices 4. Examples of the photovoltaic system with multiple rapid shutdown devices will be illustrated with reference to FIGS. 3 and 4. For succinctness, only the first switch 400 and the second switch 401 of each rapid shutdown device 4 are shown in the drawings. It is noted that structure of the rapid shutdown device 4 as shown in FIGS. 3 and 4 is identical to the structure of the rapid shutdown device 4 as shown in FIG. 1.

Figure 3:
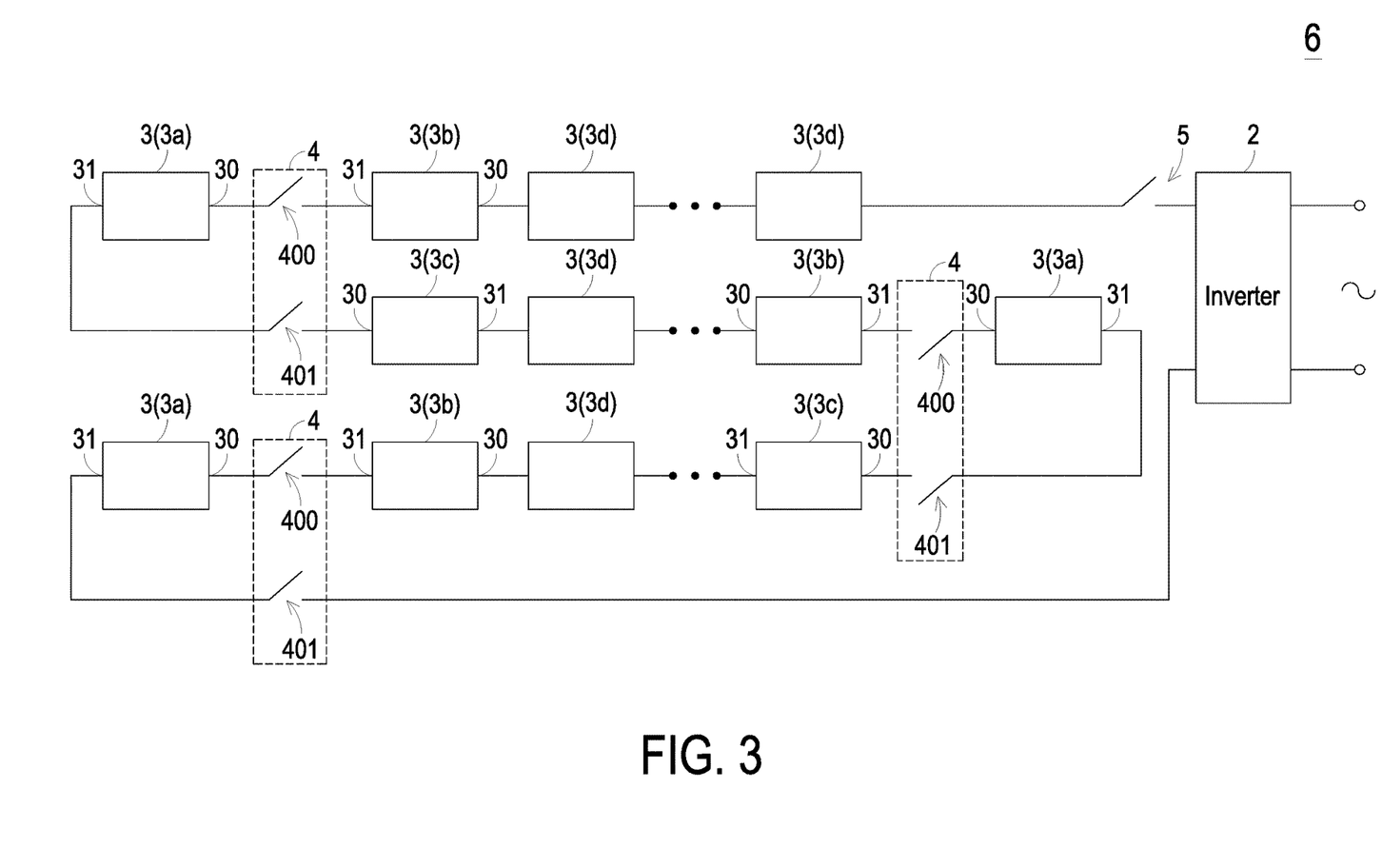
FIG. 3 is a schematic circuit diagram illustrating the architecture of a photovoltaic system according to a third embodiment of the present disclosure.

FIG. 3 is a schematic circuit diagram illustrating the architecture of a photovoltaic system according to a third embodiment of the present disclosure. Component parts and elements corresponding to those of the first embodiment are designated by identical numeral references, and detailed descriptions thereof are omitted. In comparison with the first embodiment, the photovoltaic system 6 comprises multiple rapid shutdown devices 4 and multiple first photovoltaic elements 3*a* (e.g., three rapid shutdown devices 4 and three first photovoltaic elements 3*a*). Each of the first photovoltaic elements 3*a* is electrically connected with one of the rapid shutdown devices 4. The relationships between each rapid shutdown device 4 and the corresponding first photovoltaic elements 3*a* are similar to those of the first embodiment and the second embodiment. The first terminal 400*a* of the first switch 400 of each rapid shutdown device 4 is electrically connected with the positive terminal 30 of the corresponding first photovoltaic element 3*a*. The second terminal 400*b* of the first switch 400 of each rapid shutdown device 4 is electrically connected with the negative terminal 31 of the corresponding second photovoltaic element 3*b*. The first terminal 401*a* of the second switch 401 of each rapid shutdown device 4 is electrically connected with the negative terminal 31 of the corresponding first photovoltaic element 3*a*. The second terminal 401*b* of the second switch 401 of each rapid shutdown device 4 is electrically connected with a positive terminal 30 of the corresponding third photovoltaic element 3*c*. When the first switch 400 and the second switch 401 of the rapid shutdown device 4 are turned on, the corresponding first photovoltaic element 3*a* is electrically connected with the photovoltaic system 6. When the first switch 400 and the second switch 401 of the rapid shutdown device 4 are turned off, the corresponding first photovoltaic element 3*a* is disconnected from the photovoltaic system 6. Since the photovoltaic system 6 is equipped with multiple rapid shutdown devices 4, the multiple serially-connected photovoltaic elements 3 are divided into multiple photovoltaic modules with safer voltages more quickly. Under this circumstance, the safety of the photovoltaic system 6 is enhanced. In some embodiments, as shown in FIG. 3, the second terminal 401*b* of the second switch 401 of one rapid shutdown device 4 is electrically connected with the second input terminal of the inverter 2.

Figure 4:
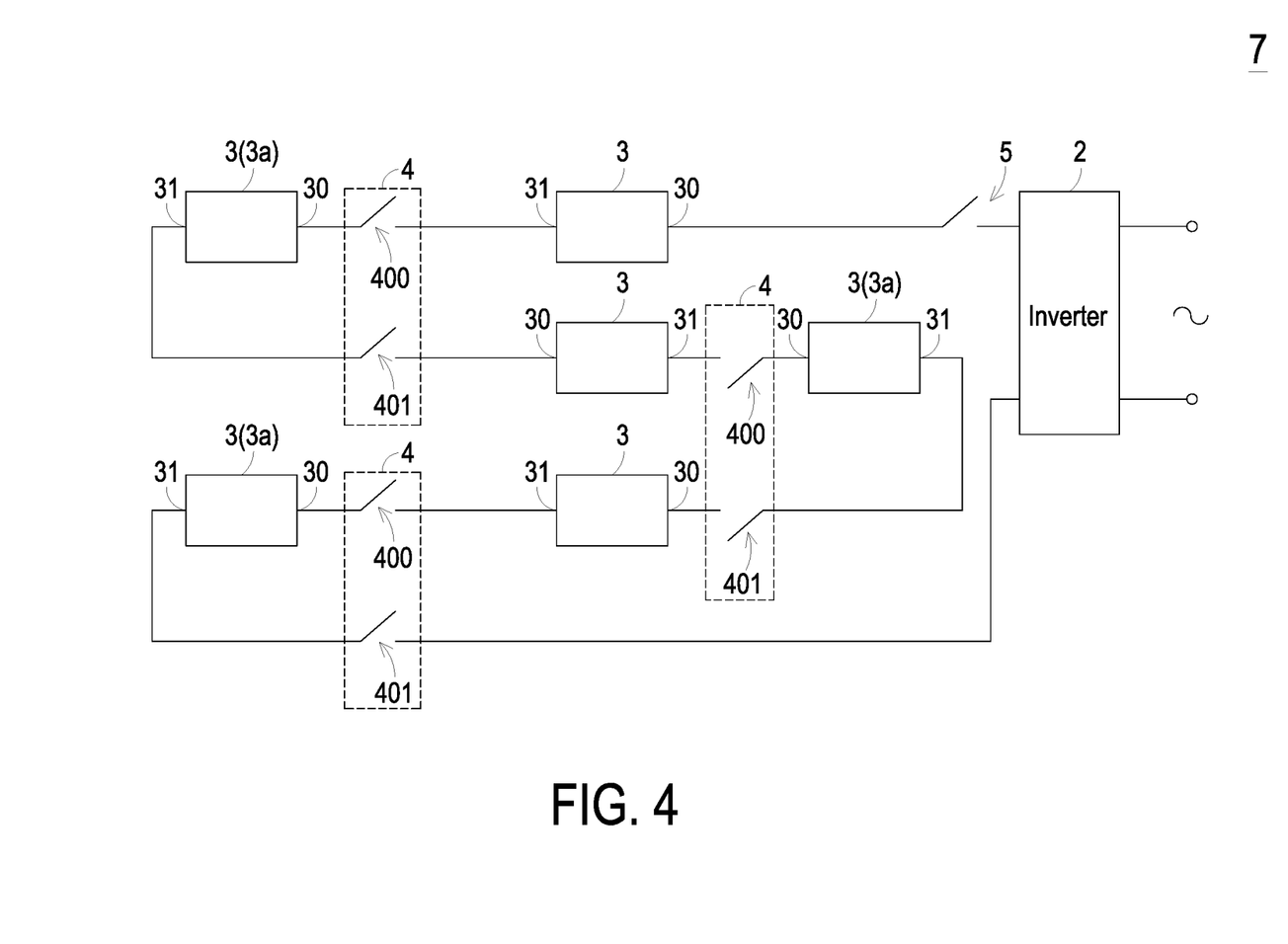
FIG. 4 is a schematic circuit diagram illustrating the architecture of a photovoltaic system according to a fourth embodiment of the present disclosure.

FIG. 4 is a schematic circuit diagram illustrating the architecture of a photovoltaic system according to a fourth embodiment of the present disclosure. Component parts and elements corresponding to those of the third embodiment are designated by identical numeral references, and detailed descriptions thereof are omitted. In the photovoltaic system 6 of FIG. 3, the photovoltaic module with multiple serially-connected photovoltaic elements 3 is retained after the corresponding first photovoltaic element 3*a* is disconnected from the photovoltaic system 6. In comparison with the third embodiment of FIG. 6, the photovoltaic system 7 also comprises multiple rapid shutdown devices 4. When the rapid shutdown devices 4 are turned off, the corresponding first photovoltaic elements 3*a* are disconnected from the photovoltaic system 7. Meanwhile, all of the multiple serially-connected photovoltaic elements 3 are disconnected from the photovoltaic system 7. Consequently, the safety of the photovoltaic system 7 is optimized. In other embodiments, each photovoltaic element 3 is connected with a corresponding rapid shutdown device 4, the photovoltaic element 3 is electrically connected with the photovoltaic system 7 or disconnected from the photovoltaic system 7 through the on/off state of the rapid shutdown device 4.

From the above descriptions, the present disclosure provides a photovoltaic system. The photovoltaic system comprises at least one rapid shutdown device. The rapid shutdown device is arranged between multiple serially-connected photovoltaic elements. When the rapid shutdown device receives the close-state command signal from the inverter, the first switch and the second switch of the rapid shutdown device are turned on. Consequently, the multiple photovoltaic elements are serially connected with each other to provide DC voltage to the inverter. If the inverter is abnormal and issues the open-state command signal, the first switch and the second switch of the rapid shutdown device are turned off. Consequently, the first photovoltaic element is disconnected from the photovoltaic system. Since the multiple serially-connected photovoltaic elements are separated, the multiple serially-connected photovoltaic elements are divided into multiple photovoltaic modules with safer voltages. When the maintenance worker maintains the photovoltaic system, the safety is enhanced and the possibility of getting electric shock is reduced. The rapid shutdown device comprises two switches, i.e., the first switch and the second switch. If one of the two switches has a fault, the other switch is normally operated. In response to the open-state command signal, the multiple serially-connected photovoltaic elements are also divided into multiple photovoltaic modules with safer voltages.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A rapid shutdown device for a photovoltaic system, the photovoltaic system comprising an inverter and multiple serially-connected photovoltaic elements, each of the photovoltaic elements comprising a positive terminal and a negative terminal, the rapid shutdown device comprising:
   a switching circuit comprising a first switch and a second switch, wherein a first terminal of the first switch is electrically connected with the positive terminal of a first photovoltaic element of the multiple photovoltaic elements, a second terminal of the first switch is directly and electrically connected with the negative terminal of a second photovoltaic element of the multiple photovoltaic elements, and a first terminal of the second switch is electrically connected with the negative terminal of the first photovoltaic element;
   a control circuit electrically connected with the first switch and the second switch, controlling the first switch and the second switch to turn on or turn off according to a command signal, wherein the multiple serially-connected photovoltaic elements are divided into multiple photovoltaic modules by turning off the first switch and the second switch;
   a communication circuit electrically connected with the control circuit and in communication with the inverter, receiving the command signal from the inverter, and transmitting the command signal to the control circuit; and
   an auxiliary power circuit providing required electric energy to power the rapid shutdown device.

2. The rapid shutdown device according to claim 1, wherein a second terminal of the second switch is electrically connected with the positive terminal of a third photovoltaic element of the multiple photovoltaic elements.

3. The rapid shutdown device according to claim 1, wherein a second terminal of the second switch is electrically connected with a second input terminal of the inverter.

4. The rapid shutdown device according to claim 1, wherein the communication circuit is a power line communication (PLC) circuit, and the command signal is a PLC command signal.

5. The rapid shutdown device according to claim 4, wherein the rapid shutdown device further comprises a capacitor, and the capacitor is electrically connected between the second terminal of the first switch and a second terminal of the second switch, wherein when first switch and the second switch are turned off, a PLC communication between the inverter and the photovoltaic elements excluding the first photovoltaic element is still established.

6. The rapid shutdown device according to claim 1, wherein
   when the command signal from the inverter is a close-state command signal, the communication circuit transmits the close-state command signal to the control circuit, and the first switch and the second switch are turned on under control of the control circuit, so that the first photovoltaic element is electrically connected with the photovoltaic system, and the photovoltaic system is normally operated,
   when the command signal from the inverter is an open-state command signal, the communication circuit transmits the open-state command signal to the control circuit, and the first switch and the second switch are turned off under control of the control circuit, so that the first photovoltaic element is disconnected from the photovoltaic system.

7. The rapid shutdown device according to claim 1, wherein the control circuit further detects whether the switching circuit is normally operated, when the control circuit detects that the switching circuit has a fault, the control circuit issues a fault message to the inverter through the communication circuit.

8. The rapid shutdown device according to claim 1, wherein the auxiliary power circuit is electrically connected with the positive terminal and the negative terminal of the first photovoltaic element, and the auxiliary power circuit receives electric energy from the first photovoltaic element and converts the electric energy into a regulated voltage for powering the rapid shutdown device.

9. The rapid shutdown device according to claim 1, wherein the photovoltaic system further comprises a third switch, a first terminal of the third switch is electrically connected with the positive terminal of a fourth photovoltaic element of the multiple photovoltaic elements, a second terminal of the third switch is electrically connected with a first input terminal of the inverter.

10. The rapid shutdown device according to claim 1, wherein each of the multiple photovoltaic elements comprises at least one photovoltaic panel.

11. The rapid shutdown device according to claim 1, wherein the first switch and the second switch are mechanical switches or electronic switches.

12. A photovoltaic system, comprising:
   multiple photovoltaic elements serially connected with each other, converting solar energy into DC voltage;
   an inverter converting the DC voltage into AC voltage; and
   a rapid shutdown device according to claim 1, wherein the rapid shutdown device is electrically connected with the first photovoltaic element of the multiple photovoltaic elements, and the first photovoltaic element is controlled by the rapid shutdown device to electrically connect with the photovoltaic system or disconnect from the photovoltaic system.

13. The photovoltaic system according to claim 12, wherein the photovoltaic system comprises multiple rapid shutdown devices and multiple first photovoltaic elements, each of the first photovoltaic elements is electrically connected with one of the rapid shutdown devices, and each of the first photovoltaic elements is controlled by the corresponding rapid shutdown device to electrically connect with the photovoltaic system or disconnect from the photovoltaic system.

14. The photovoltaic system according to claim 13, wherein when all of the multiple rapid shutdown devices are turned off, the corresponding first photovoltaic elements are disconnected from the photovoltaic system, and all of the multiple photovoltaic elements are disconnected from the photovoltaic system.

15. The photovoltaic system according to claim 12, wherein the photovoltaic system comprises multiple rapid shutdown devices, each of the multiple photovoltaic elements is electrically connected with one of the rapid shutdown devices, and each of the multiple photovoltaic elements is controlled by the corresponding rapid shutdown device to electrically connect with the photovoltaic system or disconnect from the photovoltaic system.

16. The photovoltaic system according to claim 12, wherein a second terminal of the second switch is electrically connected with the positive terminal of a third photovoltaic element of the multiple photovoltaic elements, or electrically connected with a second input terminal of the inverter.

17. The photovoltaic system according to claim 12, wherein the communication circuit is a power line communication (PLC) circuit, and the command signal is a PLC command signal.

18. The photovoltaic system according to claim 17, wherein the rapid shutdown device further comprises a capacitor, and the capacitor is electrically connected between the second terminal of the first switch and a second terminal of the second switch, wherein when first switch and the second switch are turned off, a PLC communication between the inverter and the photovoltaic elements excluding the first photovoltaic element is still established.

19. The photovoltaic system according to claim 12, wherein when the command signal from the inverter is a close-state command signal, the communication circuit transmits the close-state command signal to the control circuit, and the first switch and the second switch are turned on under control of the control circuit, so that the first photovoltaic element is electrically connected with the photovoltaic system and the photovoltaic system is normally operated, when the command signal from the inverter is an open-state command signal, the communication circuit transmits the open-state command signal to the control circuit, and the first switch and the second switch are turned off under control of the control circuit, so that the first photovoltaic element is disconnected from the photovoltaic system.

20. The photovoltaic system according to claim 12, wherein the control circuit further detects whether the switching circuit is normally operated, when the control circuit detects that the switching circuit has a fault, the control circuit issues a fault message to the inverter through the communication circuit.

\* \* \* \* \*